US009844205B2

(12) United States Patent
Smaldone et al.

(10) Patent No.: US 9,844,205 B2
(45) Date of Patent: *Dec. 19, 2017

(54) NON-SKID CONTAINER

(71) Applicant: AFJ Industries LLC, Rahway, NJ (US)

(72) Inventors: James Smaldone, Brooklyn, NY (US); Al Smaldone, Brooklyn, NY (US)

(73) Assignee: AFJ INDUSTRIES LLC, Rahway, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/383,637

(22) Filed: Dec. 19, 2016

(65) Prior Publication Data
US 2017/0094938 A1 Apr. 6, 2017

Related U.S. Application Data

(63) Continuation of application No. 14/991,314, filed on Jan. 8, 2016.

(60) Provisional application No. 62/101,093, filed on Jan. 8, 2015, provisional application No. 62/206,013, filed on Aug. 17, 2015.

(51) Int. Cl.
A47G 19/00 (2006.01)
A01K 5/01 (2006.01)
A01K 7/00 (2006.01)
A47J 43/07 (2006.01)
B65D 25/28 (2006.01)
B65D 25/14 (2006.01)

(52) U.S. Cl.
CPC ............ *A01K 5/0135* (2013.01); *A01K 7/005* (2013.01); *A47J 43/0727* (2013.01); *B65D 25/14* (2013.01); *B65D 25/28* (2013.01)

(58) Field of Classification Search
CPC .... A01K 7/005; A01K 5/0135; A01K 5/0128; B65D 25/14; B65D 25/28
See application file for complete search history.

(56) References Cited

U.S. PATENT DOCUMENTS

| 4,896,627 | A | * | 1/1990 | Riddell | ............... | A01K 5/0142 119/51.5 |
| 6,644,241 | B2 | * | 11/2003 | Brown | ................. | A01K 5/0128 119/51.01 |
| 8,714,403 | B2 | | 5/2014 | Amprimo | | |
| 8,807,082 | B1 | * | 8/2014 | Alfonso | ............... | A01K 5/0142 119/51.5 |
| 9,095,117 | B1 | | 8/2015 | Kumar | | |
| 9,339,007 | B2 | * | 5/2016 | Roth | .................... | A01K 5/0128 |
| 2012/0227668 | A1 | | 9/2012 | Aycock | | |

* cited by examiner

Primary Examiner — Shawn M Braden
(74) Attorney, Agent, or Firm — Fay Kaplun & Marcin, LLP

(57) ABSTRACT

A non-skid container having a base portion including a flat portion and a plurality of studs, an outer bowl including a sidewall, a plurality of posts, a top opening, a bottom opening and a recess, wherein the posts are configured to be coupled to the studs, thereby coupling the outer bowl to the base portion and an inner bowl configured to be coupled to the outer bowl by inserting the inner bowl into the recess of the outer bowl.

11 Claims, 15 Drawing Sheets

NON-SKID CONTAINER

PRIORITY CLAIM/INCORPORATION BY REFERENCE

This application claims priority to U.S. Provisional Application 62/101,093 entitled "Non-skid Container," filed on Jan. 8, 2015, and U.S. Provisional Application 62/206,013 entitled "Non-skid Container," filed on Aug. 17, 2015, the entirety of both applications are incorporated herein by reference.

BACKGROUND INFORMATION

Bowls and containers are used for many purposes. Examples include pet bowls that are used to hold water and food for dogs, cats, etc. Other examples include bowls that are used for preparing food such as mixing ingredients, etc. A major drawback for these containers is that they tend to move as they are being used. Most dog owners have seen their dog pushing the food bowl around the floor trying to reach the last of the food. Most pet owners have also accidentally kicked their pet's water bowl causing the bowl to move and water to spill on the floor. Similarly, when a person is mixing ingredients in a bowl on a counter, for example, using a hand mixer, the bowl sometimes moves or slides around the counter causing problems or inconvenience for the person.

SUMMARY

A non-skid container having a base portion including a flat portion and a plurality of studs, an outer bowl including a sidewall, a plurality of posts, a top opening, a bottom opening and a recess, wherein the posts are configured to be coupled to the studs, thereby coupling the outer bowl to the base portion and an inner bowl configured to be coupled to the outer bowl by inserting the inner bowl into the recess of the outer bowl.

A non-skid container having a base portion including a force dissipating component, a coupler coupled to the base portion and a bowl coupled to the coupler, such that a force exerted on the coupler or the bowl causes the force dissipating component to rotate without causing the base part to move with respect to a surface on which the non-skid container is placed.

A non-skid container having a container portion including a sidewall and a bottom surface and a non-skid bottom portion secured to the bottom surface of the container portion, wherein the non-skid bottom portion is a low hardness material that when placed on a surface prevents lateral movement of the non-skid container.

DETAILED DESCRIPTION

Figure 1:
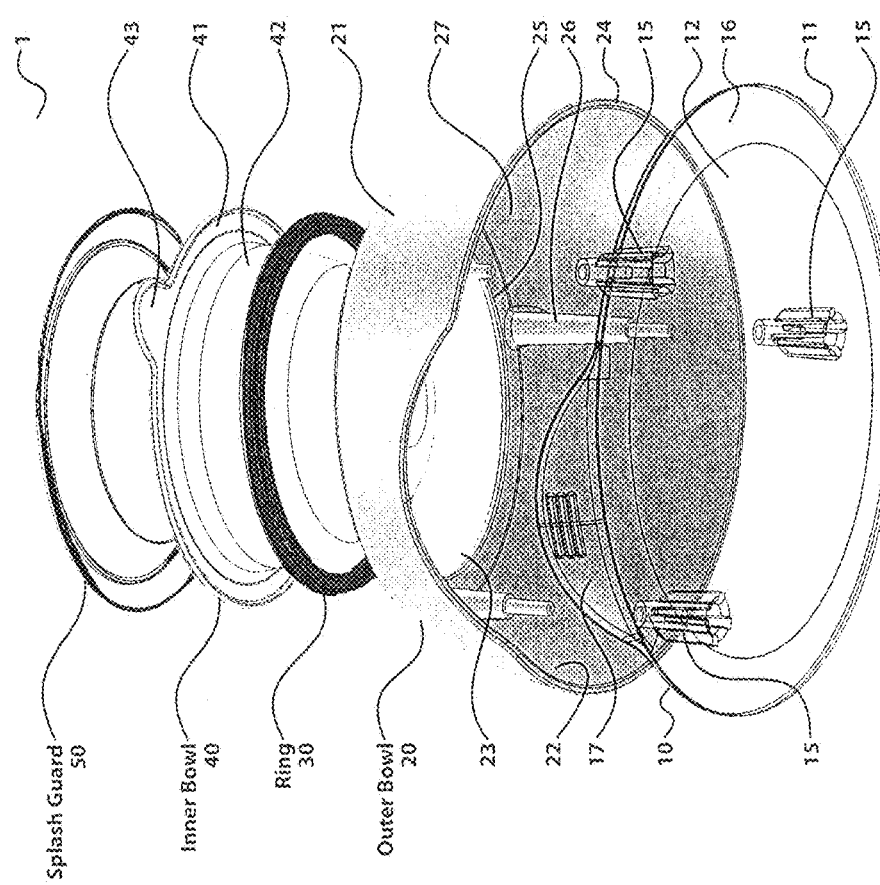
FIG. 1 shows an exploded view of a first exemplary embodiment of a non-skid container.

The exemplary embodiments may be further understood with reference to the following description and the appended drawings, wherein like elements are referred to with the same reference numerals. The exemplary embodiments describe a non-skid container that may be used in any application currently employing a standardized container or bowl, e.g., pet bowl, mixing bowl, fruit bowl, cup, mug, child's bowl, etc. The various exemplary embodiments show different designs for the non-skid container. However, it should be understood that the features described for each of the exemplary embodiments may be combined with or used individually with features from other exemplary embodiments. For example, some exemplary embodiments will be described as having a splash guard, while other exemplary embodiments are not specifically described as including a splash guard. It should be understood that the splash guard from one exemplary embodiment may be modified to be used with an exemplary embodiment that is not described as including a splash guard.

FIG. 1 shows an exploded view of a first exemplary embodiment of a non-skid container 1. The non-skid container 1 includes a base portion 10, an outer bowl 20, a ring 30, an inner bowl 40 and a splash guard 50. Each of these components will be described in greater detail below.

The base portion 10 is shown as having a generally circular shape with a flat portion 16 having a surface contacting area 11 that will come into contact with any surface onto which the non-skid container 1 is placed. Those skilled in the art will understand that the base portion 10 is not required to be circular in shape, but may take on any shape that is consistent with the design of the non-skid container. The diameter of the base portion 10 may be generally about the same size as the diameter of the non-skid container 1. However, the diameter of the base portion 10 may vary to be larger or smaller than the diameter of the non-skid container 1. Since the surface contacting area 11 is the portion of the non-skid container 1 that comes into contact with surfaces, it is the portion of the non-skid container 1 that will have some of the non-skid characteristics. For example, the base portion 10 may be constructed of any material that resists lateral movement of the non-skid container 1 when in contact with a surface. In one example, the base portion 10 may be constructed of low durometer rubber or plastic type material. A specific example may be a silicone-based product that has a durometer hardness (Shore A) of 25. It should be understood that this is only an example and other hardness ranges and types of materials may be used for the base portion 10. It should also be understood that the entirety of the base portion 10 does not need to be made of the same material. For example, the surface contacting area 11 may be constructed of the non-skid material while other areas of the base portion 10 are constructed of different types of materials or different hardness ranges of the same material.

The flat portion 16 of the base portion 10 also includes an upper face 12 to which a plurality of studs 15 are integrally connected to the base portion 10. In this example, there are three (3) studs 15. However, there may be any number of studs 15, including a single stud. The studs 15 may be integrally connected to the upper face 12 in any known manner such as being molded as a single component, being sonically welded, being held with a mechanical fastener such as a screw or rivet, etc. The studs 15 may be constructed from the same type of material as the flat portion 13, e.g., rubber or plastic type material. However, it is possible that the studs 15, while constructed from the same material, may be harder (e.g., as measured by durometer hardness) than the material used for the surface contacting area 11. In one example, the studs 15 may be a silicone-based product that has a durometer hardness (Shore A) of 65. However, it should be understood that this is only an example and other hardness ranges and types of materials may be used for the studs 15. The studs 15 may also be constructed of a different material than the flat portion 13 of the base portion 10.

Figure 2:
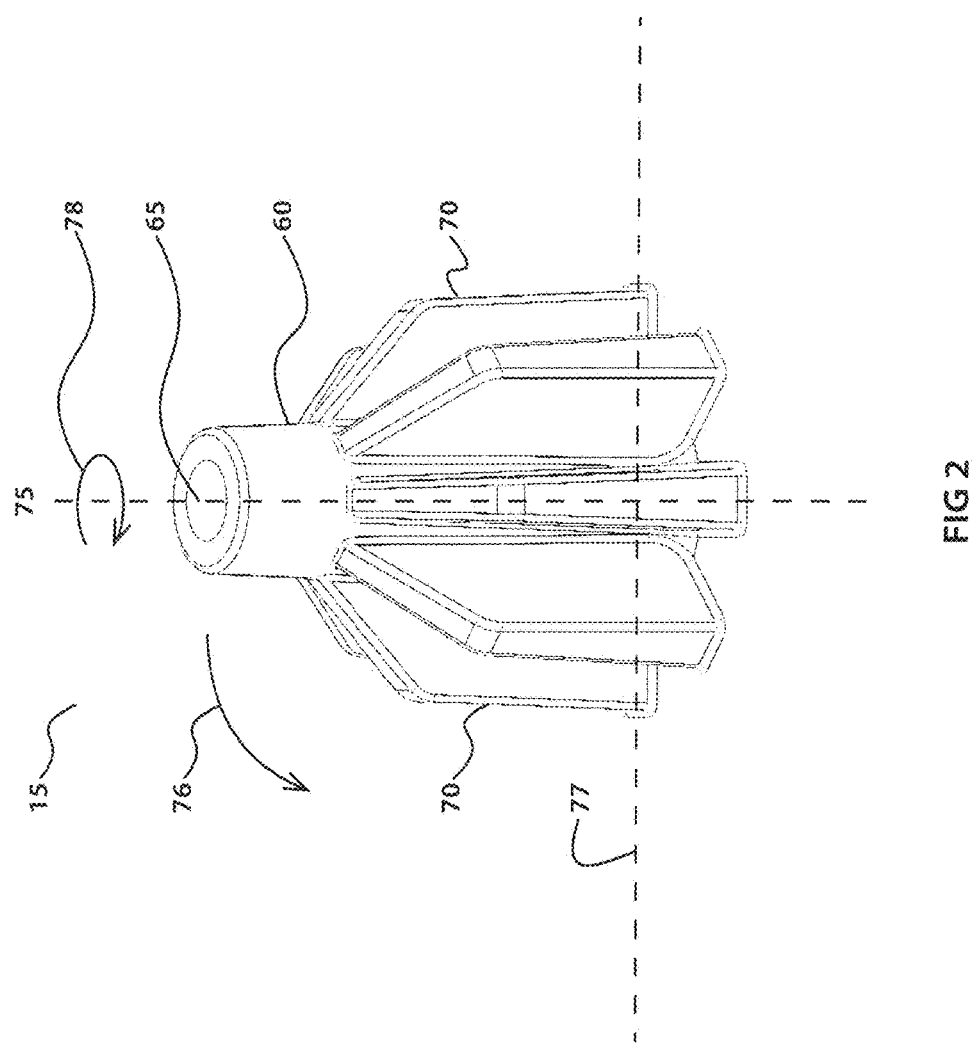
FIG. 2 shows a plan view of an exemplary embodiment of a stud of a base portion of the exemplary non-skid container.

FIG. 2 shows a plan view of an exemplary embodiment of a stud 15 of a base portion 10 of the exemplary non-skid container 1. The stud 15 includes a generally cylindrical center portion 60 that includes a receiving portion 65. Thus, the studs 15 may be considered as being a female connecting portion that may receive a male connecting portion in receiving portion 65. Those skilled in the art will understand that the stud 15 may also be configured as a male connecting part. As will be described in greater detail below, the studs 15 will be used to connect the base portion 10 to the outer bowl 20.

The stud 15 also includes ribs 70 to provide reinforcement for the studs. As will also be described in greater detail below, when the non-skid container 1 is placed on a surface, the longitudinal axis 75 of the stud 15 will be generally vertical and perpendicular to the surface. When a force is applied to the non-skid container 1, the studs 15 may flex or bend. This flexing or bending may occur in various directions depending on the type and level of force applied to the non-skid container 1. For example, the flexing or bending may occur in the direction of arrow 76. In this example, the top portion of the stud 15 will rotate downward with respect to the plane 77 where the stud 15 is attached to the flat portion 13 of the base portion 10. In another example, the stud may rotate in the direction of arrow 78 with respect to the longitudinal axis 75. Those skilled in the art will understand that the flexing, bending or rotation described with respect to arrows 76 and 78 are only exemplary and there may be other types and/or directions of movement that the studs undergo when a force is applied to the non-skid container 1. Throughout the remainder of this description, the flexing, bending or rotation of the studs 15 will be referred to as "rotating" or "rotation," but it should be understood to mean any of the described movement of the studs 15.

The ribs 70 provide reinforcement such that the studs 15 absorb or diffuse the force and come back into alignment along the original longitudinal axis 75. In one exemplary embodiment, the stud 15 has four ribs 70 at the four orthogonal directions around the cylindrical center portion 60 (only two are shown in the plan view of FIG. 2). In another exemplary embodiment, eight (8) ribs are distributed equidistantly around the periphery of the cylindrical center portion 60. However, those skilled in the art will understand that more or less ribs 70 may be used to reinforce the stud 15. In addition, those skilled in the art will understand that the ribs 70 may take a different shape to reinforce the stud 15.

Returning to FIG. 1, the base portion 10 also includes a handle 17. When the non-skid container 1 is assembled and placed on a surface, the handle 17 may be used to lift the base portion 10 from the surface, thereby removing the non-skid container 1 from the surface. Those skilled in the art will understand that the base portion 10 (surface contacting area 11, upper face 12, studs 15 and handle 17) may be molded as a single component or may be constructed from separate components.

The non-skid container 1 also includes the outer bowl 20. The outer bowl 20 may be constructed of any type of material such as melamine, plastic, stainless steel, rubber, ceramic, etc. In the example of FIG. 1, the diameter of the outer bowl 20 is generally the same as the diameter of the base portion 10. The outer bowl 20 includes a sidewall comprising an outer wall 21 and an inner wall 22. The outer bowl 20 has a generally tapered cylindrical shape with a top opening 23 and a bottom opening 24. The generally tapered cylindrical shape formed by the sidewall results in a recess 27 within the outer bowl 20. There is a cutout portion in the outer bowl 20 to accommodate the handle 17 of the base portion when the non-skid container 1 is assembled. In the area of the top opening 23, a support surface 25 is provided. A top area of the support surface 25 provides an area to support the ring 30 and the inner bowl 40 which will be described in greater detail below.

In addition, a bottom area of the support surface 25 provides an area from which posts 26 extend. The posts 26 may be constructed of the same material as the remainder of the outer bowl 20 or may also be constructed from a different material than the outer bowl 20, e.g., the same material as the base 10 or the studs 15. As shown in this example, the posts 26 are male connecting members and are arranged in a manner that corresponds to the studs 15. As shown in FIG. 1 by the dashed lines, the posts 26 may be inserted into the studs 15 to connect the base portion 10 to the outer bowl 20. Thus, the number of posts 26 may correspond to the number of studs 15, but it is not a requirement. It is contemplated that the components of the first exemplary embodiment of the non-skid container 1 (e.g., the base portion 10, the outer bowl 20, the inner bowl 40, etc.) are separable from each other. Thus, the coupling of the posts 26 of the outer bowl 20 to the studs 15 of the base portion 10 may form a releasable coupling between the base portion 10 and the outer bowl 20. However, the coupling may also be a permanent connection such that once the posts 26 are inserted into the studs 15, the base portion 10 and the outer bowl 20 are permanently connected, e.g., can only be separated by breaking the posts 26 and/or the studs 15. Also, as described above, if the studs 15 are configured as male connecting members, the posts 26 may be configured as female connecting members. Similar to the studs 15, the posts 26 may be integrally connected to the support surface 25 in any known manner such as being molded as a single component, being sonically welded, being held with a mechanical fastener such as a screw or rivet, etc.

The non-skid container 1 also includes the inner bowl 40 and the ring 30. As described above, the ring 30 may rest on the upper area of the support surface of the outer bowl 20 and a lip 41 of the inner bowl 40 may rest upon the ring 30. Thus, in the assembled position, a body 42 of the inner bowl 40 is inserted into the recess 27 within the outer bowl 20. The inner bowl 40 is the vessel for holding contents, e.g., water or other liquids, pet food, food, fruit, etc. The inner bowl 40 may also include a tab 43 that may be used to remove the inner bowl 40 from the recess 27 of the outer bowl 20. Thus, if the contents of the inner bowl 40 need to be poured out or refilled (e.g. new water for a pet), the entire non-skid container 1 does not have to be moved. Rather, the inner bowl 40 may be removed, filled and then replaced back into the assembled non-skid container. The inner bowl 40 may be constructed of any material such as stainless steel, melamine, plastic, rubber, ceramic, etc.

The ring 30 may be constructed of any type of material such as silicone, plastic, rubber, etc. In one example, the ring 30 may be a silicone-based product that has a durometer hardness (Shore A) of 65. However, it should be understood that this is only an example and other hardness ranges and types of materials may be used for the ring 30. The ring 30 provides support between the outer bowl 20 and inner bowl 40 and seals the recess 27 of the outer bowl 20 so that the contents of the inner bowl 40 do not leak into the recess 27. It should be noted that the ring 30 may be connected to the support surface 25 of the outer bowl 20 in different manners than just resting on the support surface 25. For example, the ring 30 may have a U-shape such that it snaps onto the support surface 25 such that one leg of the U-shape contacts the top area of the support surface 25 and the other leg of the U-shape contacts the bottom area of the support surface 25. This example of ring 30 is shown in FIG. 4, which will be described in greater detail below.

The non-skid container 1 also includes the splash guard 50 which may be constructed of any material such as plastic, polypropylene, a polycarbonate, etc. The splash guard 50 may be configured to snap onto a rim of the inner bowl 40 to resist splashing and spilling of the contents of the inner bowl 40. In another exemplary embodiment, the splash guard 50 and the inner bowl 40 may form a unitary piece. In such an embodiment, the splash guard 50 and the inner bowl 40 may be constructed of the same material. The operation of the splash guard 50 will be described in greater detail below.

Figure 3:
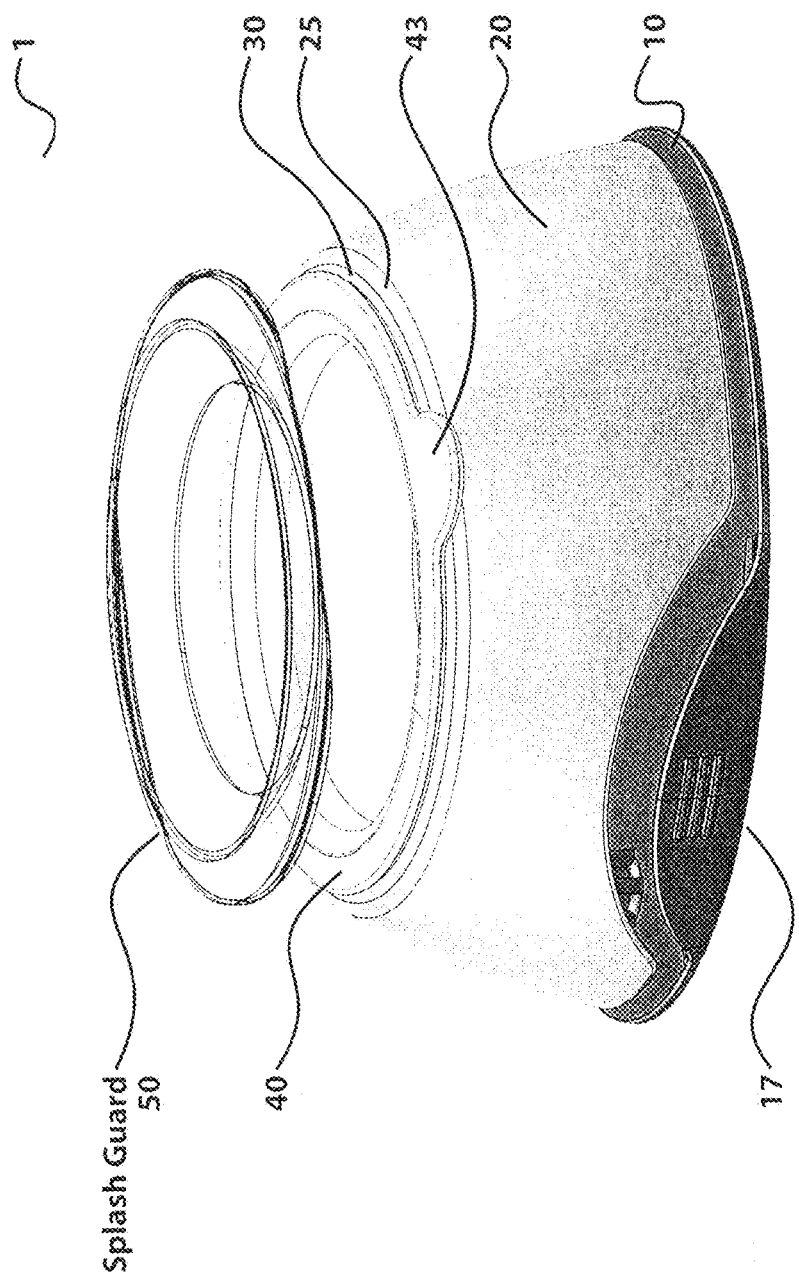
FIG. 3 shows an assembled view of a first exemplary embodiment of a non-skid container.

FIG. 3 shows an assembled view of a first exemplary embodiment of the non-skid container 1. As described above, the posts 26 (not shown in FIG. 3) of the outer bowl 20 are inserted into the studs 15 (not shown in FIG. 3) of the base portion 10 to couple the base portion 10 to the outer bowl 20. The ring 30 is inserted onto the support surface 25 of the outer bowl 20 and the inner bowl 40 is placed onto the ring 30. The splash guard 50 is then inserted onto the rim of the inner bowl 40 to result in a fully assembled non-skid container 1. This embodiment of the non-skid container 1 allows the different components to be disassembled and cleaned individually.

Figure 4:
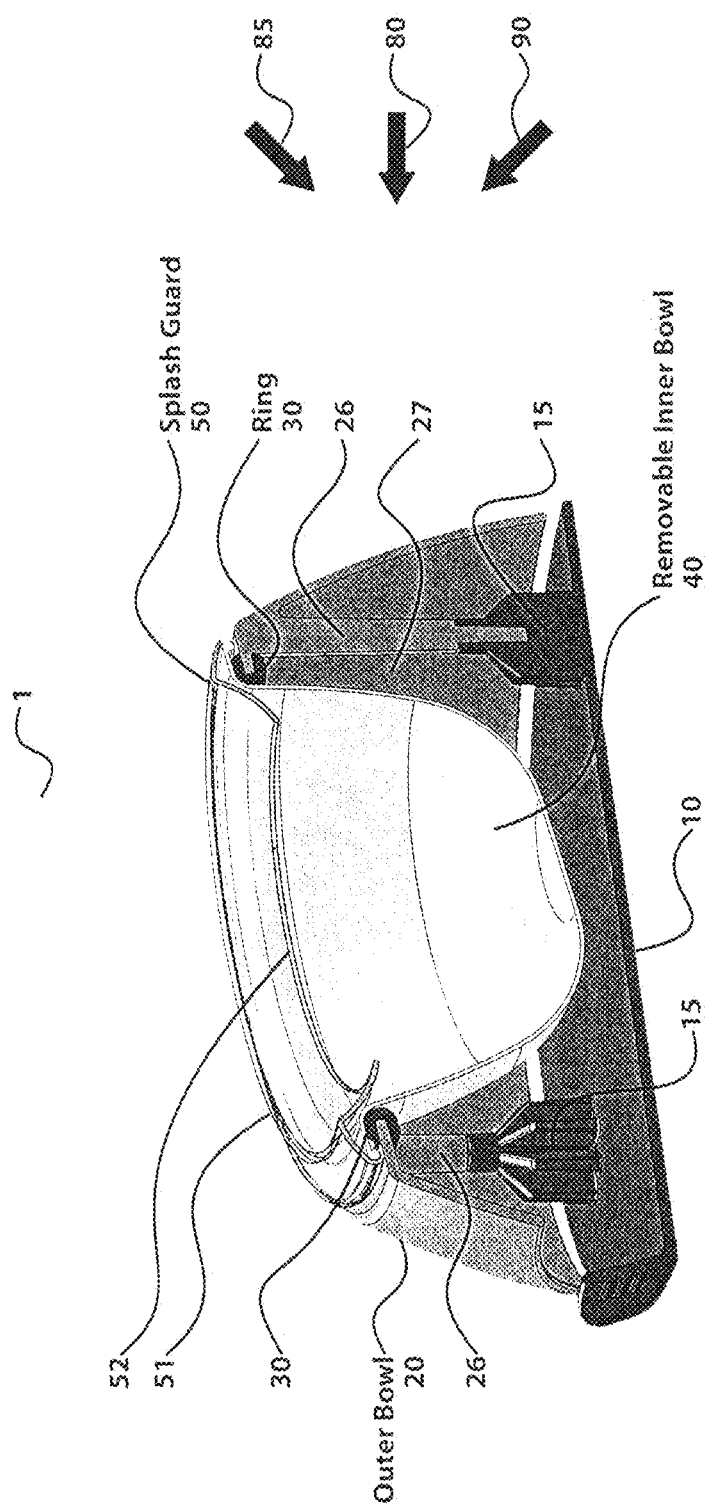
FIG. 4 shows a cross-sectional view of the assembled first exemplary embodiment of a non-skid container.

FIG. 4 shows a cross-sectional view of the assembled first exemplary embodiment of a non-skid container 1. In this view, the posts 26 of the outer bowl 40 are inserted into the studs 15 of the base portion 10 to couple the base portion 10 to the outer bowl 40. The ring 30 is inserted onto the support surface 25 of the outer bowl 20. The ring 30 in this embodiment is of the U-shape design described above. The lip of the inner bowl 40 is placed onto the ring 30 and the inner bowl 40 is in the recess 27 of the outer bowl 20. The splash guard 50 is then inserted onto the rim of the inner bowl 40 to result in a fully assembled non-skid container 1. It should be noted that in the example of FIG. 4, the top of the splash guard 50 or the top of the outer bowl 40 are not parallel to the surface on which the a non-skid container 1 is placed. While this is not a requirement of the non-skid container 1, the slight tilt may allow for easier access to the content of the outer bowl 40.

When assembled, the non-skid container 1 may be placed on a surface such that the bottom surface 11 of the base portion 10 contacts the surface. If a force is exerted on the non-skid container 1 from the side (e.g., in the direction of arrow 80), the outer bowl 20 and the inner bowl 40 will deflect. This deflection is caused by the rotation of the studs 15 of the base portion 10. As described above, the studs 15, as a result of the applied force, will rotate, thereby causing a deflection of the outer bowl 20 and the inner bowl 40. Specifically, the studs 15 will rotate to diffuse the force. Because the posts 26 are inserted into the studs 15, the posts 26 will move in the direction of the rotation. Since the posts 26 are part of the outer bowl 20, the outer bowl 20 will also move in the direction of the rotation. The ring 30, inner bowl 40 and splash guard 50, which are either directly or indirectly, coupled to the outer bowl 20 will therefore also move in the direction of the rotation. The amount of rotation will be based on the stiffness of the studs 15 (e.g., the hardness of the material) and the amount of force. However, the force is absorbed or diffused by the studs 15 rotating and not transferred to the flat portion 13 of the base portion 10. Thus, the force does not cause the base portion 10 to move with respect to the surface on which the non-skid container 1 is sitting. Therefore, a force from the side (e.g., in the direction of arrow 80) does not cause the non-skid container 1 to move.

As also described above, the stiffness of the studs 15 will cause the studs to absorb or diffuse the force and come back into alignment along the original longitudinal axis 75. Thus, the outer bowl 20, the ring 30, the inner bowl 40 and the splash guard 50 will also move back to their original position. Since the base portion 10 will remain stationary with respect to the surface on which it is placed, the force 80 will result in no movement by the non-skid container 1 with respect to the surface.

For example, if the non-skid container 1 is a dog bowl, the force that the dog exerts on the non-skid container 1 when eating or drinking will not cause the non-skid container 1 to move across the floor. In another example, if the pet owner accidentally kicks the non-skid container 1, the non-skid container 1 will not cause the contents of the inner bowl 40 to spill all over the floor. It should be noted that while the force is shown as being exerted in the direction 80 that is generally parallel to the surface on which the non-skid container 1 is placed and perpendicular to the longitudinal axis 75 of the studs 15, it should be understood that the force may not always be exerted in exactly this manner. For example, when a person kicks the bowl, their foot may be coming down (e.g., exerting a force in the downward direction as shown by arrow 85) or coming up (e.g., exerting a force in the downward direction as shown by arrow 90). Again, these are also only examples, as the force may be exerted at any angle on the outer bowl 20. However, regardless of the direction and angle of the exerted force, the studs 15 will rotate to absorb or diffuse the force as described above. Thus, the non-skid container 1 will react in the same manner, it will not move relative to the surface on which it is placed.

Furthermore, the force does not need to be exerted onto the outer bowl 20. In the example of the dog eating, the dog's snout may be pressed up against the inside of the inner bowl 40. Thus, the force is exerted onto the inner bowl 40 rather than the outer bowl 20. Similarly, there may be a force applied to the splash guard 50 or any other exposed component of the non-skid container 1. Regardless of where the force is exerted, it should be understood that studs 15 will absorb or diffuse this force by rotating as described above and the non-skid container 1 will not move relative to the surface on which it is placed.

It should be noted that the surface on which the non-skid container 1 is placed may be any type of surface. For example, the surface may be any flooring material such as ceramic tile, wood, concrete, engineered flooring (wood based or synthetic based), etc. In another example, the surface may be a countertop or table. Thus, the surface may be wood, ceramic, granite, glass, engineered countertop material (e.g., Formica, Corian, etc.).

As described above, when a force is applied to the non-skid container 1 (e.g., force in the direction of arrow 80), the outer bowl 20 and the inner bowl 40 will be deflected and then move back to their original position. However, it will be appreciated that this deflection may cause the contents of the inner bowl 40 to move. For example, if the contents of the inner bowl 40 are liquid, it may cause a wave to move back and forth across the bowl. This wave, if big enough, may cause some of the contents to spill onto the surface. The splash guard 50 is designed to prevent such spillage. For example, as shown in FIG. 4, the splash guard extends from an outer edge 52 (which is positioned over the lip of the inner bowl 40) to an inner edge 51 (which is positioned over an upper opening of the inner bowl 40). Thus, the splash guard 50 partially covers the upper opening of the inner bowl 40. If such a wave is created, instead of splashing over the lip of the inner bowl 40, the wave hits the splash guard 50 and the contents are prevented from spilling out of the inner bowl 40. Those skilled in the art will understand that the splash guard will also work in the same general manner if the contents of the inner bowl 40 are non-liquid, such as pet food. In addition, it should be understood that the splash guard 50 should be sized such that while preventing spillage, the splash guard 50 still allows access to the inner bowl 40, e.g., a pet may still eat or drink from the inner bowl 40, a person may still easily access the contents of the inner bowl 40, etc.

Finally, while the non-skid container 1 is designed to not move relative to a surface on which it is placed, the handle 17 of the base portion 10 is designed to be used to pick up the non-skid container when a user wants to move the non-skid container 1 relative to the surface. The handle 17 is designed such that the user may pick up the base portion 10 and any connected components by lifting in a generally vertical direction with respect to the surface. This will cause the flat surface contacting area 11 to disengage from the surface and allow the non-skid container 1 to be moved.

Figure 5:
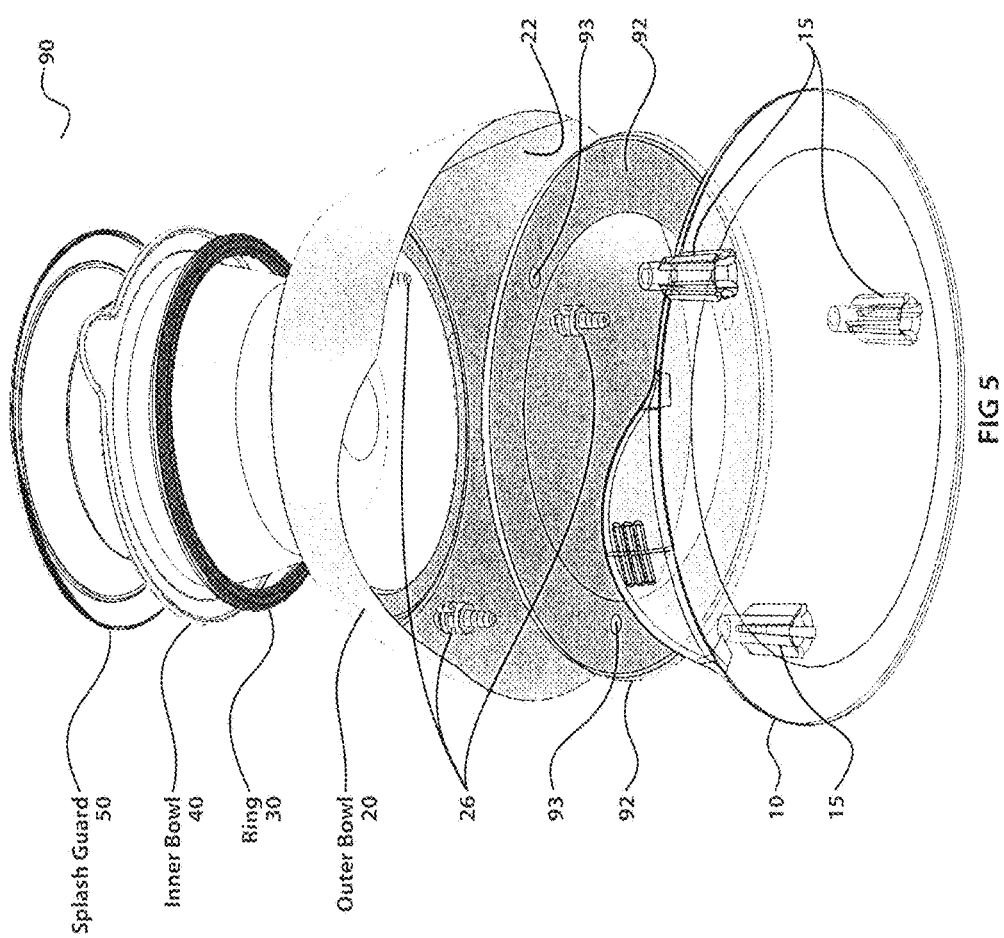
FIG. 5 shows an exploded view of a second exemplary embodiment of a non-skid container.

FIG. 5 shows an exploded view of a second exemplary embodiment of a non-skid container 90. The non-skid container 90 is similar to the non-skid container 1 in that it includes the components of a base portion 10, an outer bowl 20, a ring 30, an inner bowl 40 and a splash guard 50. As each of these components was described in detail above, no further description will be provided, except where the embodiment varies from the above exemplary embodiment.

In this exemplary embodiment, it is contemplated that the outer bowl 20 will be constructed of metal (e.g., steel, stainless steel, aluminum, etc.). It should be noted that the outer bowl 20 of the first embodiment may also be constructed of metal. In this exemplary embodiment, the posts 26 are not connected to the support surface 25 of the outer bowl 20. Rather, this embodiment includes a support ring 92 that is attached to the inner wall 22 of the outer bowl 20. The support ring 92 may be attached to the inner wall 22 in any known manner, e.g., spot welded, mechanical fasteners, etc. The support ring may include a plurality of holes 93 that correspond to the studs 15 of the base portion 10. The holes 93 may be lined up with the studs 15 and the posts 26 may then be inserted through the holes 93 into to the studs 15. Thus, the base portion 10 may be coupled to the outer bowl 20 in this manner.

Figure 6:
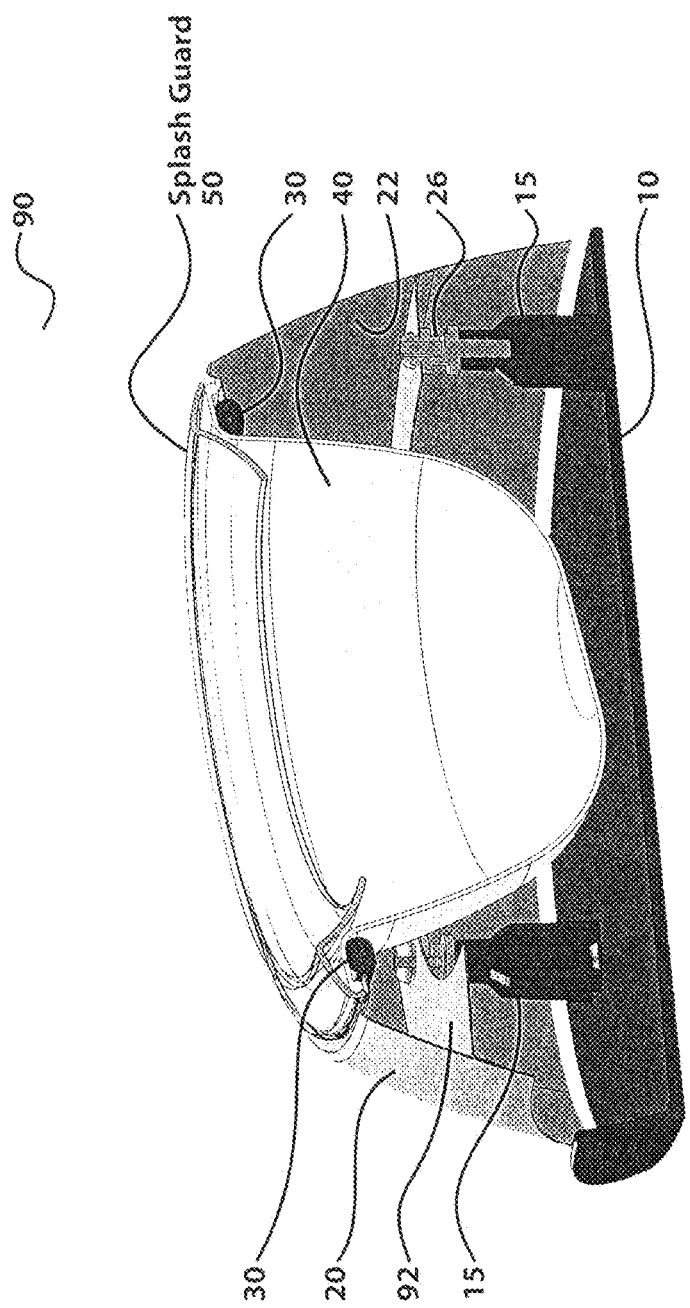
FIG. 6 shows a cross-sectional view of the assembled second exemplary embodiment of a non-skid container.

FIG. 6 shows a cross-sectional view of the assembled second exemplary embodiment of a non-skid container 90. As shown in this FIG. 6, the support ring 90 is coupled to the inner wall 22 of the outer bowl 20. The posts 26 are inserted through the holes of the support ring 92 into the studs 15 of the base portion 10. The principle of operation, e.g., the rotation of the studs 15 in reaction to an applied force on the non-skid container 90, is the same as described above for the non-skid container 1.

Figure 7:
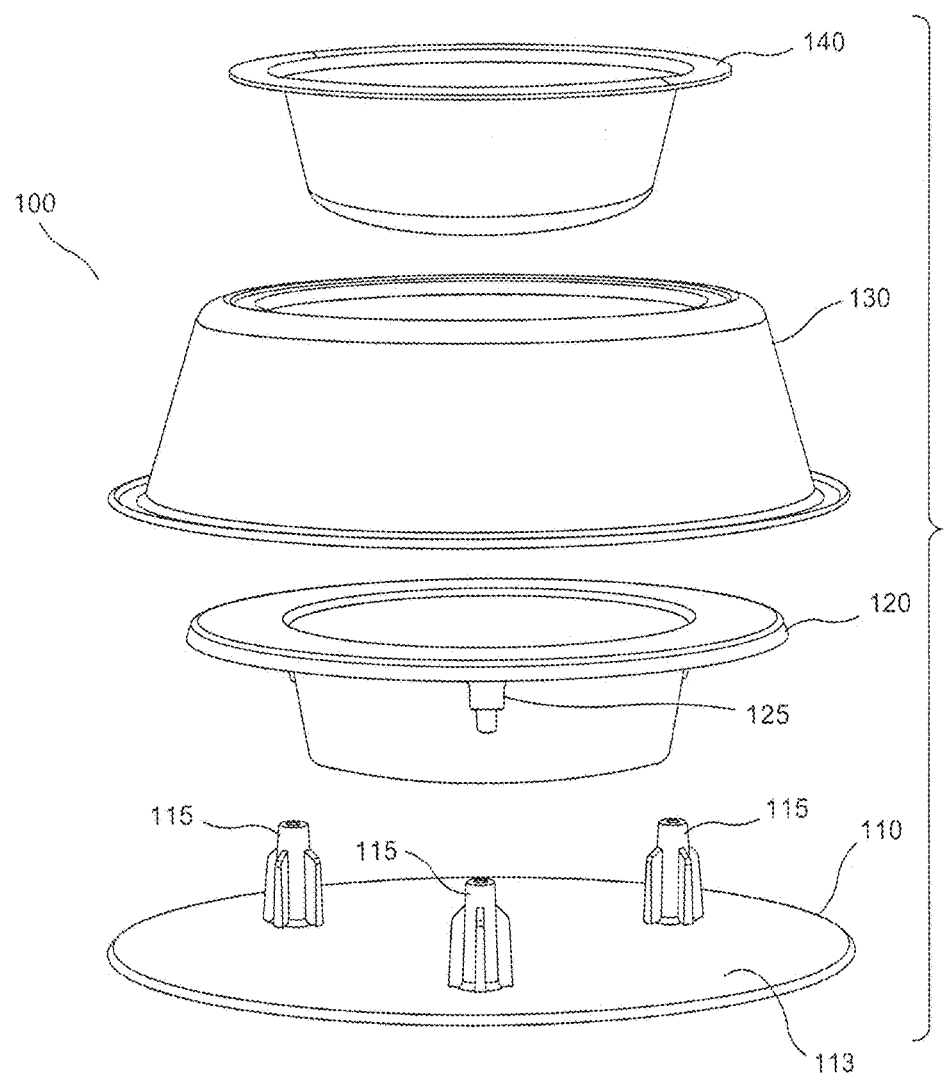
FIG. 7 shows an exploded view of a third exemplary embodiment of a non-skid container.

FIG. 7 shows an exploded view of a third exemplary embodiment of a non-skid container 100. The non-skid container 100 is a 4-part container. The base portion 110 is configured to be the bottom of the container that contacts the surface (e.g., the floor, counter top, etc.) on which the non-skid container 100 is to be placed. The base portion 110 may be constructed from a rubber or plastic type material. A specific example may be a silicone-based product that has a durometer hardness (Shore A) of 70. It should be understood that this is only an example and other hardness ranges (e.g., a range of 20-100 hardness) and types of materials may be used for the base portion 110.

The base portion 110 includes a flat portion 113 and a plurality of studs 115 that are integrally connected to the flat portion 113. Those skilled in the art will understand that the base portion 110 (flat portion 113 and studs 115) may be molded as a single component. In this example, there are three (3) studs 115. However, there may be any number of studs 115, including a single stud. The studs 115 may be similar to the studs 15 described above. The diameter of the flat portion 113 may be generally about the same size as the diameter of the non-skid container 100. However, the diameter of the flat portion 113 may vary to be larger or smaller than the diameter of the non-skid container 100.

The non-skid container 100 further includes a coupler 120 that is configured to be coupled to the base portion 110. The coupler 120 includes posts 125 that may be similar to the posts 26 described above. In this example, the posts 125 of the coupler 120 may be inserted into the studs 115 of the base portion 110. The coupler 130 may be permanently or releasably connected to the base portion 110. The coupler 120 may be constructed of any type of material such as plastic, stainless steel, rubber, ceramic, etc.

Figure 8:
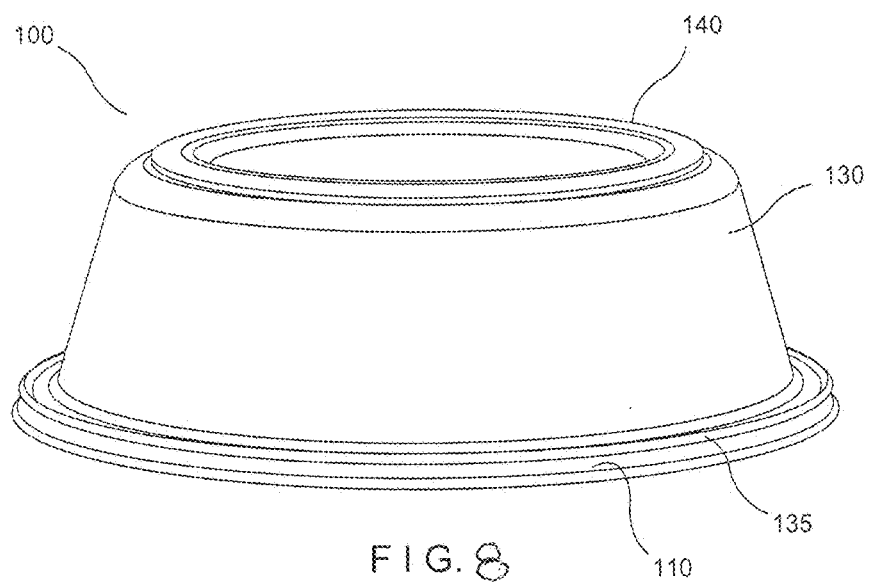
FIG. 8 shows an assembled view of a third exemplary embodiment of a non-skid container.

The non-skid container 100 further includes an outer bowl 130 that is configured to be connected to the coupler 120. The connection between the coupler 120 and the outer bowl 130 is such that the outer bowl 130 does not touch the base portion 110. For example, FIG. 8 shows an assembled non-skid container 100 that includes a gap between the bottom edge 135 of the outer bowl 130 and the base portion 110. The outer bowl 130 may be constructed of any type of material such as plastic, stainless steel, rubber, ceramic, etc.

The non-skid container 100 further includes an inner bowl 140 that is configured to be inserted into the outer bowl 130 such that the inner bowl 140 may be removed without moving the remaining parts of the non-skid container 100. Again, referring to the assembled non-skid container 100 of FIG. 8, the inner bowl 140 is shown as being inserted into the outer bowl 130. In this example, an edge of the inner bowl 140 engages with an edge of the outer bowl 130 to support the inner bowl 140. The inner bowl 140 may be constructed of any type of material such as plastic, stainless steel, rubber, ceramic, etc.

Figure 9:
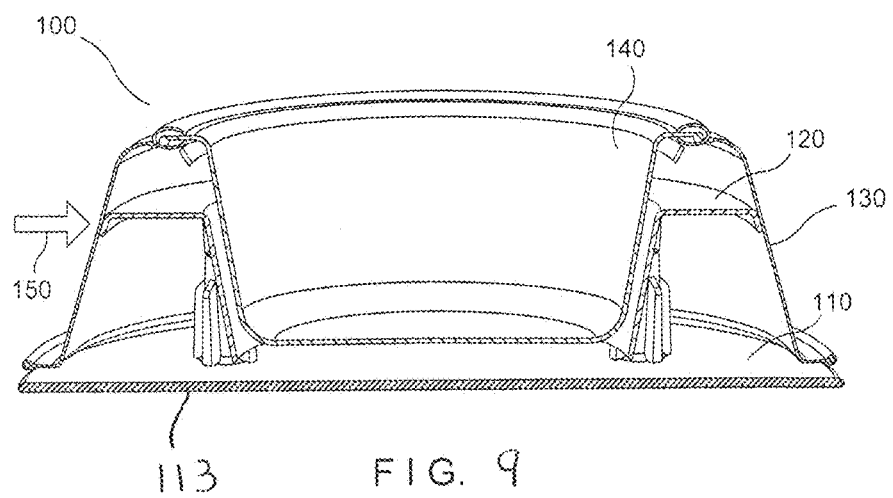
FIG. 9 shows a cross-sectional view of the assembled third exemplary embodiment of a non-skid container.

FIG. 9 shows a cross-sectional view of an assembled non-skid container 100 including the base portion 110, the coupler 120, the outer bowl 130 and the inner bowl 140. When assembled, the non-skid container 100 may be placed on a surface such that a bottom surface of the base portion 110 contacts the surface. If a force is exerted on the non-skid container 100 from the side (e.g., in the direction of arrow 150), the outer bowl 130, the inner bowl 140 and the coupler 120 will deflect. This deflection is caused by a rotation of the studs 115 of the base portion 110 in a similar manner as was described above for the first exemplary embodiment. In other words, the studs 115, as a result of the applied force, will rotate, thereby causing a deflection of the outer bowl 130, the inner bowl 140 and the coupler 120. The amount of rotation will be based on the stiffness of the studs (e.g., the hardness of the material) and the amount of force. However, the force is absorbed or diffused by the studs 115 rotating and not transferred to the flat portion 113 of the base portion 110. Thus, the force does not cause the base portion 110 to move with respect to the surface on which the base portion 110 is sitting. Therefore, a force from the side does not cause the non-skid container 100 to move. For example, if the non-skid container 100 is a dog bowl, the force that the dog exerts on the non-skid container 100 when eating or drinking will not cause the non-skid container to move across the floor.

Figure 10:
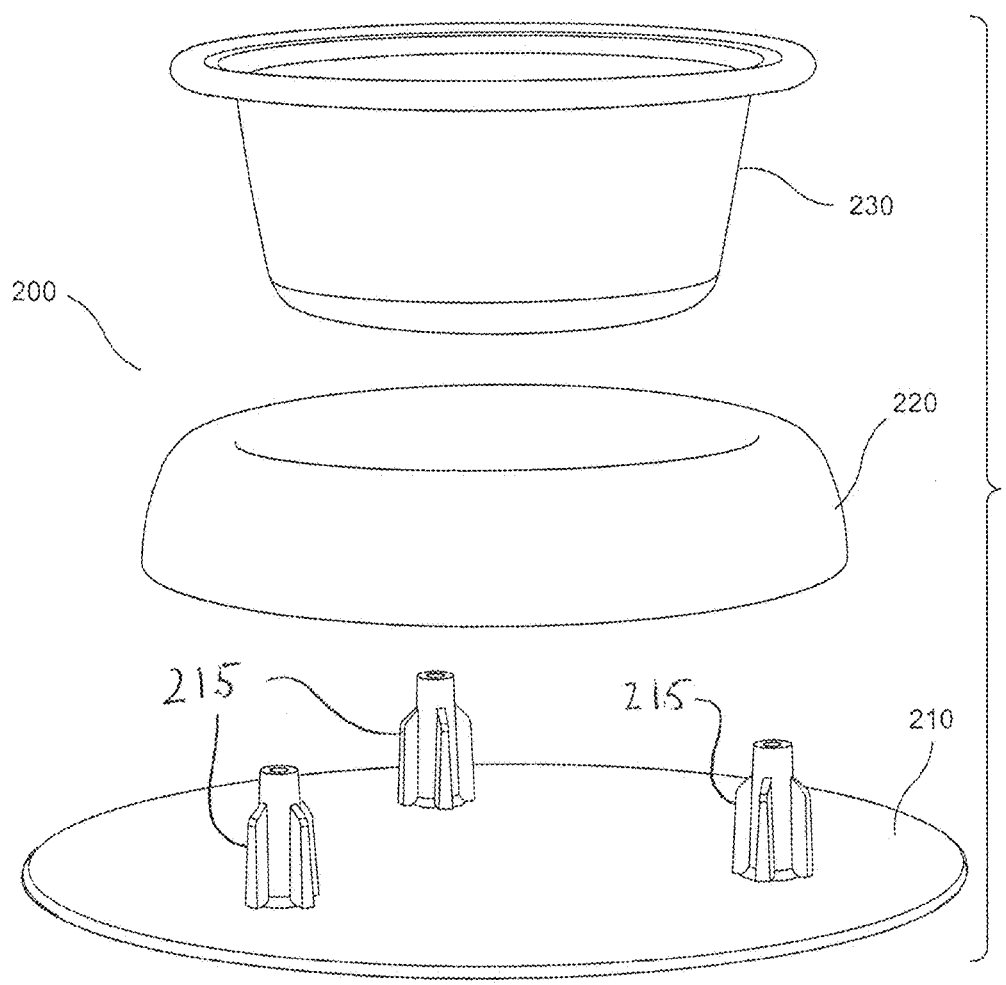
FIG. 10 shows an exploded view of a fourth exemplary embodiment of a non-skid container.
Figure 12:
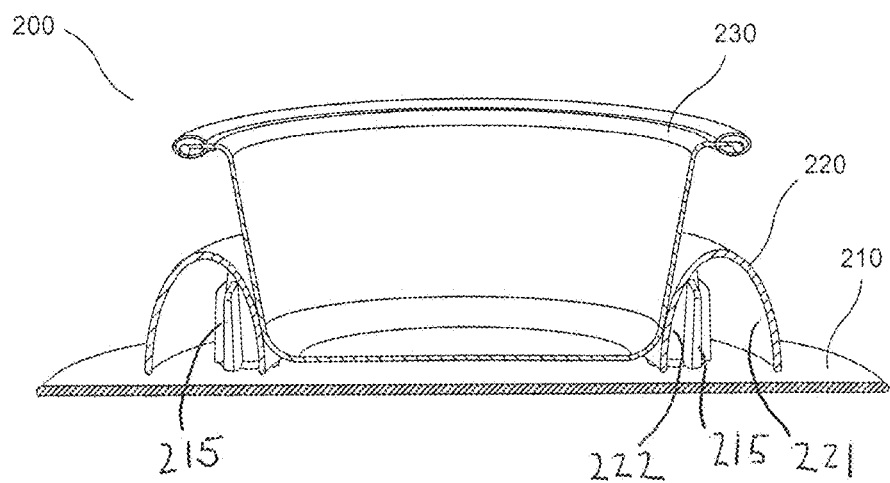
FIG. 12 shows a cross-sectional view of the assembled fourth exemplary embodiment of a non-skid container.

FIG. 10 shows an exploded view of a fourth exemplary embodiment of a non-skid container 200. The non-skid container 200 is a 3-part container. The base portion 210 is similar in construction to the base portion 110 described above for the non-skid container 100. The non-skid container 200 further includes a coupler 220 that is configured to be connected to the base portion 210. The coupler 220 may include posts (not shown) similar to the posts 125 described above for the coupler 120 of the non-skid container 100. The posts may be inserted into the studs 215 to couple the base portion 210 to the coupler 220. However, in a further exemplary embodiment, the coupler 220 may not include posts. Rather, the studs 215 may be sized such that the studs 215 engage the inner walls of the coupler 220 and are coupled by a friction fit. Referring to FIG. 12, the studs 215 may engage the inside walls 221 and 222 of the coupler 220. In addition, where such a friction fit is used, the studs 215 may be shaped in a different manner to more securely engage the inner walls 221 and 222.

In this exemplary embodiment, the coupler 220 is configured to receive a bowl 230 within the coupler 220, in contrast to the embodiment described above where the coupler 120 is connected to the outer bowl 130. That is, the bowl 230 is inserted into the coupler 220 without the need for an outer bowl. Thus, in this exemplary embodiment, the bowl 230 is more similar to the inner bowl 140 of the non-skid container 100, e.g., the bowl 230 and the inner bowl 140 are the components that will hold the contents of the non-skid container such as food or liquid.

Figure 11:
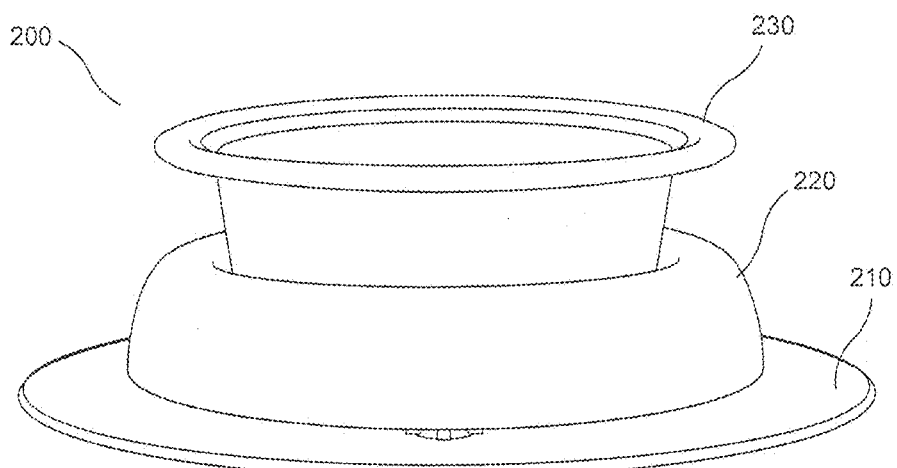
FIG. 11 shows an assembled view of a fourth exemplary embodiment of a non-skid container.

FIG. 11 shows an assembled view of the non-skid container 200 having the base portion 210, the coupler 220 and the bowl 230. FIG. 12 shows a cross-sectional view of the non-skid container 200 having the base portion 210, the coupler 220 and the bowl 230. Similar to the embodiments described above, a force exerted on the side of the bowl 230 will cause the studs 215 of the base part 210 to rotate and the bowl 230 and coupler 220 to deflect, but the base portion 210 will not move with respect to the surface on which the non-skid container 200 is placed. Unlike the non-skid container 100, the coupler 220 of the non-skid container 200 is exposed. Thus, a force may also act upon the coupler 220. The non-skid container 200 will react to this force in the same manner as described above if the force was exerted on the bowl 230.

Figure 13:
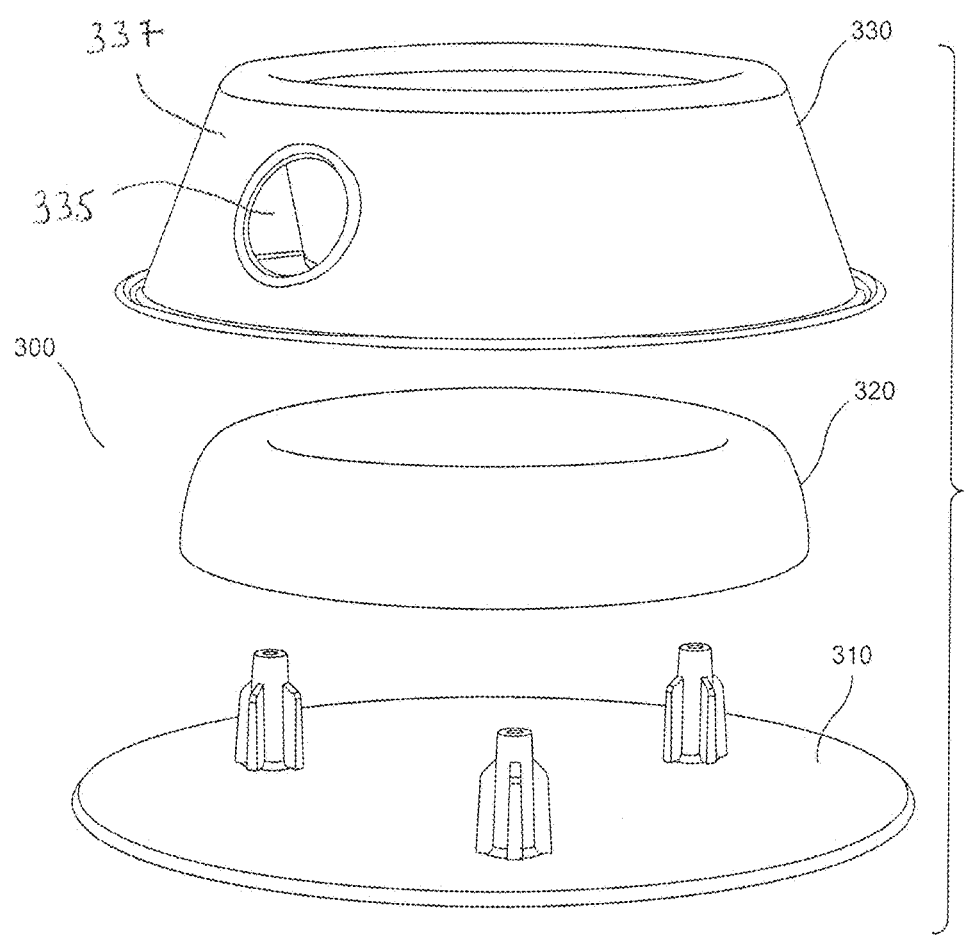
FIG. 13 shows an exploded view of a fifth exemplary embodiment of a non-skid container.

FIG. 13 shows an exploded view of a fifth exemplary embodiment of a non-skid container 300. The non-skid container 300 is a 3-part container. The base portion 310 is similar in construction to the base portion 110 described above for the non-skid container 100. The non-skid container 300 further includes a coupler 320 that is configured to be connected to the base portion 310. The coupler 320 is similar in construction to the coupler 120 described above for the non-skid container 100. However, in contrast to the 3-part container 200 described above, in this exemplary embodiment the coupler 320 is configured to receive a bowl 330 such that an outer wall 337 of the bowl 330 is outside the coupler 320, e.g., when assembled, the coupler 320 is not visible, except through a cutout 335.

Figure 14:
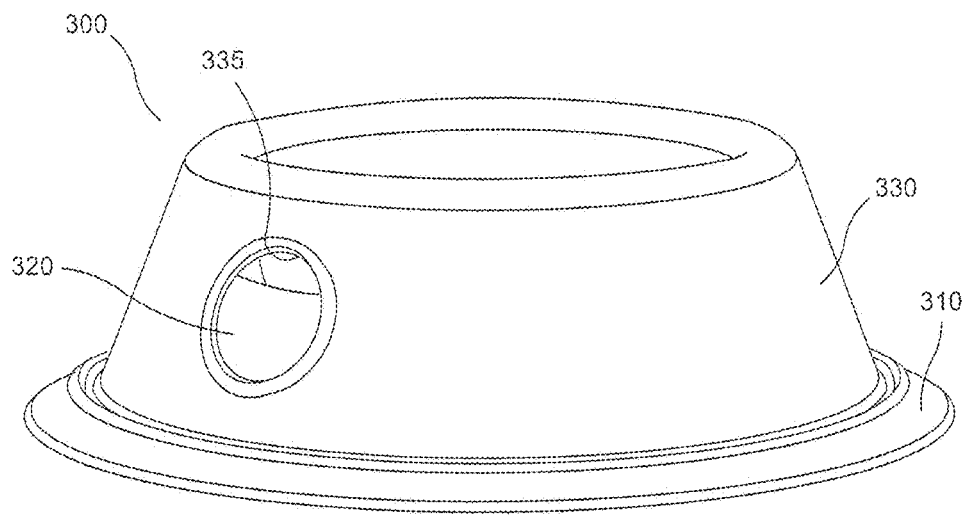
FIG. 14 shows an assembled view of a fifth exemplary embodiment of a non-skid container.

FIG. 14 shows an assembled view of the non-skid container 300 having the base portion 310 and the bowl 330, as the coupler 320 is only visible through the cutout 335 in the bowl 330. The cutout 335 may be used to remove the bowl 330 from the ring portion 320.

Figure 15:
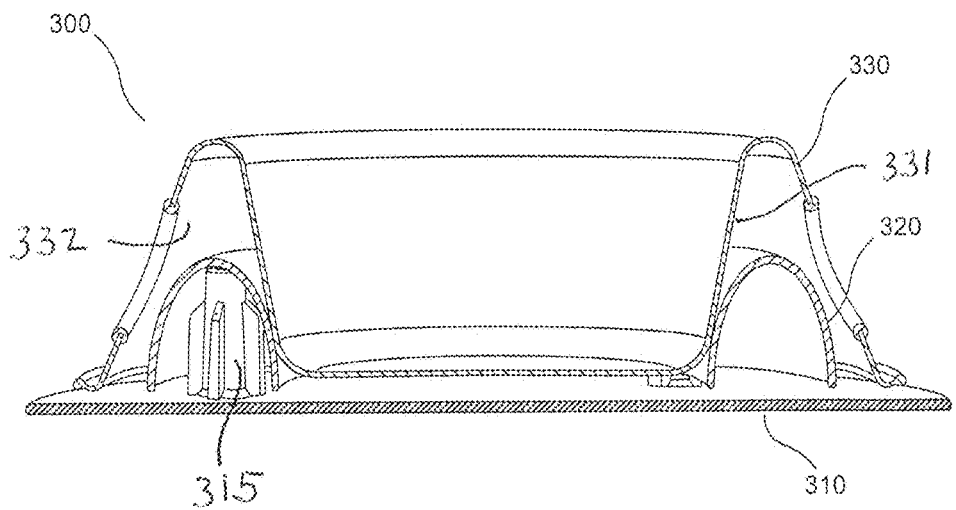
FIG. 15 shows a cross-sectional view of the assembled fifth exemplary embodiment of a non-skid container.

FIG. 15 shows a cross-sectional view of the assembled non-skid container 300 having the base portion 310, the coupler 320 and the bowl 330. As shown in this view, the bowl 330 essentially includes the inner bowl 140 and the outer bowl 130 of the above-described embodiment as a single integral component. Thus, the coupler 320 may engage an inside of both an inner wall 331 and an outer wall 332 of the bowl 330.

Similar to the embodiments described above, a force exerted on the side of the bowl 330 will cause the studs 315 of the base portion 310 to rotate and the bowl 330 and coupler 320 to deflect, but the base part 310 will not move with respect to the surface on which the non-skid container 200 is placed.

Figure 16:
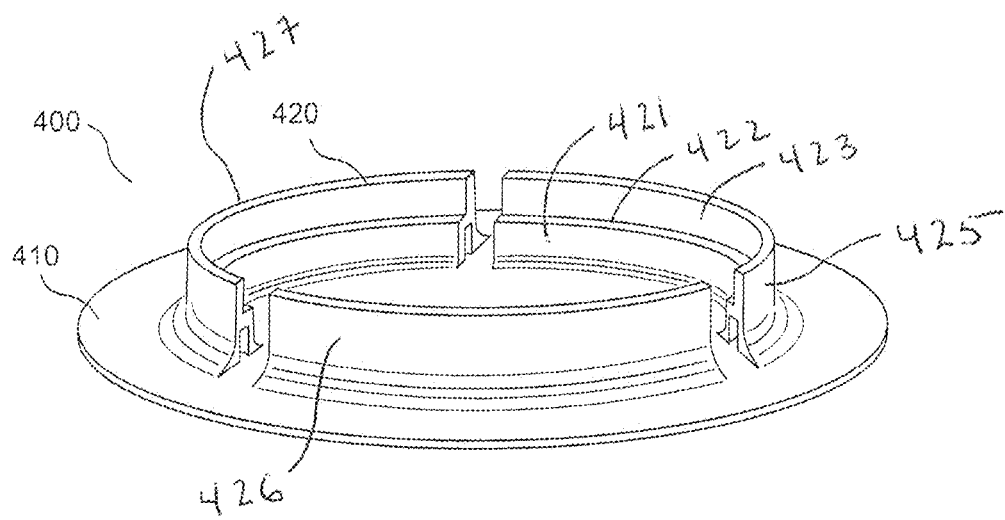
FIG. 16 shows a base portion of a sixth exemplary embodiment of a non-skid container.

FIG. 16 shows a base portion 400 of a sixth exemplary embodiment of a non-skid container. The base portion 400 includes a flat portion 410 that is similar in construction to the flat portion 110 described above for the non-skid container 100. However, unlike the previous embodiments of the base portions, this base portion 410 does not have studs, but rather has a circular ridge 420. In this example, the circular ridge 420 has a step design including a first riser 421, a first step 422 and a second riser 423. The circular ridge 420 is shown as having three distinct portions 425, 426 and 427. However, it should be understood that the circular ridge 420 may have more or less portions and may also be a single continuous ridge. The circular ridge 420 performs the same functionality as the studs, e.g., the circular ridge 420 will bend without causing a force on the flat portion 410 of the base portion 400. Thus, similar to the examples described above, the flat portion 410 may be constructed from a first material having a lower hardness than a second material used for the circular ridge 420. Although, this is only an example, and the material used to construct the flat portion 410 and the circular ridge 420 may be the same. Accordingly, the studs of the previous embodiments and the circular ridge of the current embodiment may be referred to as force dissipating components.

Figure 17:
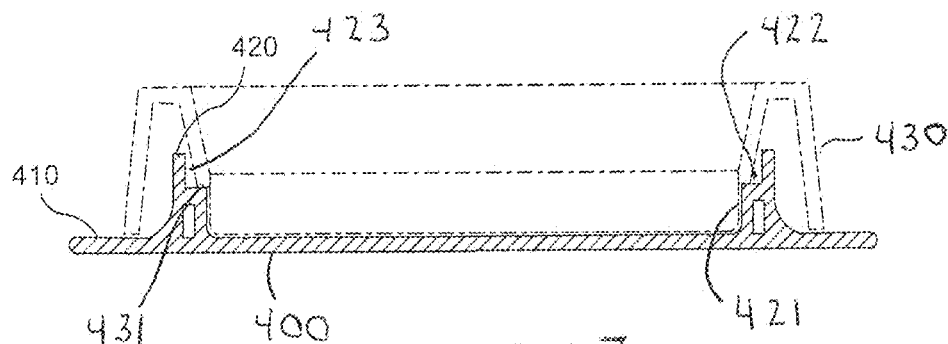
FIG. 17 shows a cross-sectional view of the assembled sixth exemplary embodiment of a non-skid container.

FIG. 17 shows a cross-sectional view of an assembled non-skid container 440 having the base portion 400 and a bowl 430 (shown in phantom). As shown in this example, the bowl 430 is sized such that it fits snuggly into the area between the inside of the first riser 421. In addition, the bowl 430 includes a first lip 431 that rests on the first step 422 of the circular ridge 420. In this example, the bowl 430 does not contact the second riser 423. However, this is not a requirement. When a force is exerted on the bowl 430, the circular ridge 420 will bend and absorb the force in the same manner as was described above for the studs. Thus, the principle of operation of the non-skid container 440 is similar to the embodiments described above, just the mechanism used to absorb or dissipate the force is different.

Figure 18:
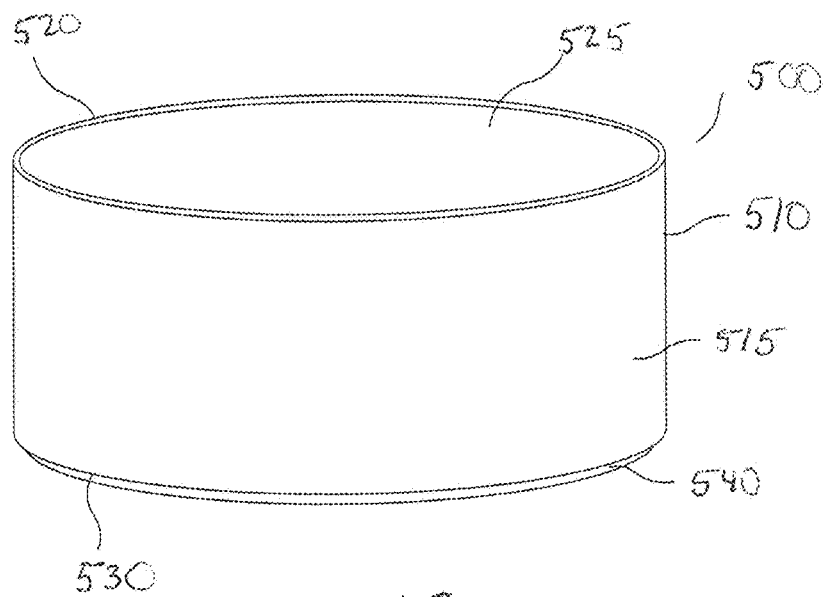
FIG. 18 shows a seventh exemplary embodiment of a non-skid container.

FIG. 18 shows a seventh exemplary embodiment of a non-skid container 500. The non-skid container 500 includes an upper container portion 510 and a bottom non-skid portion 540. The upper container portion 510 may be any type of container that is used to hold liquids or solids. For example, the upper container portion 510 may be a water bowl for a pet, a mixing bowl, a cup, a mug, a child's bowl, etc. The upper container portion 510 may be made from any material commonly used to make such containers, such as stainless steel, aluminum, ceramic, plastic, etc. Thus, the upper container portion 510 includes a sidewall 515, an upper rim 520 that surrounds an upper opening 525 and a bottom surface 530.

The bottom non-skid portion 540 is attached to the bottom surface 530 of the upper container portion 510. The attachment of the bottom non-skid portion 540 to the bottom surface 530 may be effected in any manner known in the art for the specific materials that are used to construct the bottom non-skid portion 540 and the upper container portion 510. The bottom non-skid portion 540 may be made of any material that resists lateral movement of the non-skid container 500 when in contact with a surface. In one example, the bottom non-skid portion 540 may be constructed low durometer rubber or plastic type material. A specific example may be a silicone-based product that has a durometer hardness (Shore A) of 10±0.5. It should be understood that this is only an example and other hardness ranges and types of materials may be used for the bottom non-skid portion 540.

Figure 19:
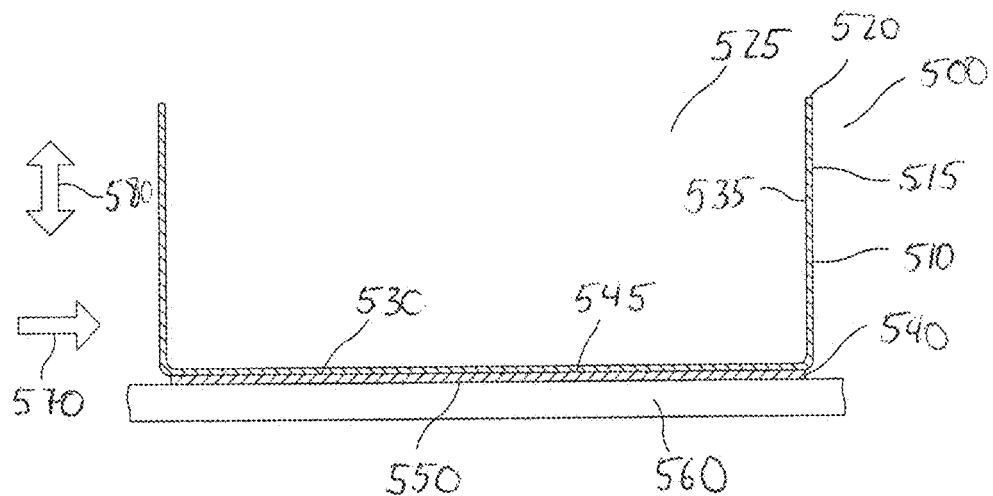
FIG. 19 shows a cross-sectional view of the seventh exemplary embodiment of a non-skid container.

FIG. 19 shows a cross-sectional view of the non-skid container 500. Similar to the view of FIG. 18, FIG. 19 shows the upper container portion 510 including the sidewall 515 and the upper rim 520 that surrounds the upper opening 525. In addition, FIG. 19 shows an interior wall 535 of the upper container portion 510. FIG. 19 also shows the bottom surface 530 of the upper container portion 510 to which the bottom non-skid portion 540 is attached. In this view, it can be seen that the bottom non-skid portion 540 has an upper side 545, which is in contact with the bottom surface 530. The bottom non-skid portion 540 also includes a lower side 550. When the non-skid container 500 is placed on a surface 560, the lower side 550 contacts the surface 560.

To provide some examples, the non-skid container 500 may be a water bowl for a dog that is normally placed on the floor when filled. Thus, the surface 560 may be any flooring material such as ceramic tile, wood, concrete, engineered flooring (wood based or synthetic based), etc. In another example, the non-skid container 1 may be a mixing bowl that is normally placed on a countertop or table when in use. Thus, the surface 560 may be wood, ceramic, granite, glass, engineered countertop material (e.g., Formica, Corian, etc.).

In FIG. 19, a force in the lateral direction on the non-skid container 500 is indicated by lateral arrow 570. A normal container subject to such a lateral force would slide along the surface 560. Referring to the examples from above, everyone is familiar with a dog sliding a bowl along the floor when eating or drinking or a mixing bowl moving on the countertop as a person is attempting to mix ingredients. This movement is the result of a lateral force being exerted on the bowl and causes annoyance and inconvenience for the dog or the chef. It is noted that a vertical force as indicated by the arrow 580 may also be exerted on the bowl. However, the vertical force may be in the up direction or down direction. When in the up direction, a person is normally attempting to lift the bowl. When in the down direction, the person (or animal) is typically performing some function related to the bowl (e.g., eating, mixing, etc.). However, these vertical forces contribute little to causing the bowl to slide along the surface 560.

The bottom non-skid portion 540, when resting on the surface 560, resists movement in the lateral direction caused by a lateral force exerted on the non-skid container 500. Specifically, the material used to construct the bottom non-skid portion 540 adheres to the surface 560 such that when a force is applied in the lateral direction (e.g., in the direction of arrow 570), the bottom non-skid portion 540 prevents the non-skid container 500 from moving on surface 560 (e.g., sliding on the floor). However, since the adherence between the surface 560 and the bottom non-skid portion 540 is a dispersive adhesive force, when a user desires to lift the non-skid container 500 (e.g., applies a force in the vertical direction as shown by arrow 580), the non-skid container 500 lifts up easily. In one embodiment, the bottom non-skid portion 540 may include a tab to allow the user to apply the vertical force to lift up the non-skid container 500.

Figure 20:
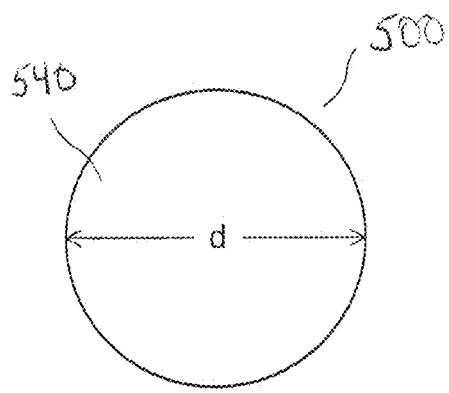
FIG. 20 shows a first bottom view of the seventh embodiment of a non-skid container.

FIG. 20 shows a first bottom view of the seventh embodiment of a non-skid container 500. In this embodiment, the bottom non-skid portion 540 is coextensive with the bottom surface 530 of the upper container portion 510. The bottom surface 530 is not shown in FIG. 20 because it is hidden behind the bottom non-skid portion 540. That is, the diameter d of the bottom non-skid portion 540 is equal to the diameter of the bottom surface 530.

Figure 21:
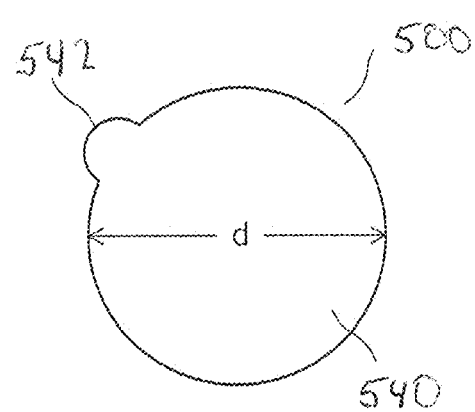
FIG. 21 shows a second bottom view of the seventh embodiment of a non-skid container.

FIG. 21 shows a second bottom view of the seventh embodiment of a non-skid container 500. The embodiment of FIG. 21 is identical to the embodiment of FIG. 20, except that the bottom non-skid portion 540 includes a tab 542 that extends outside the perimeter of the bottom surface 530. As described above, the tab 542 may be used to allow the user to apply the vertical force to break the adhesive force between the bottom non-skid portion 540 and the surface 560.

Figure 22:
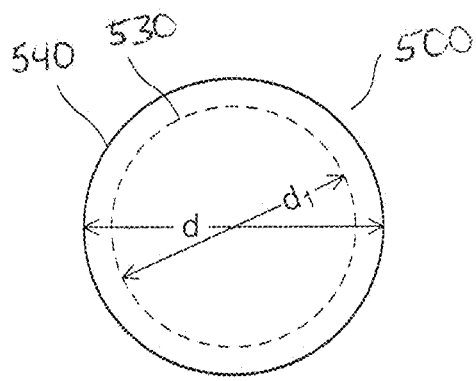
FIG. 22 shows a third bottom view of the seventh embodiment of a non-skid container.

FIG. 22 shows a third bottom view of the seventh embodiment of the non-skid container 500. In this embodiment, the bottom non-skid portion 540 has a larger diameter d than the diameter $d_1$ of the bottom surface 530 (shown in dashed lines). Thus, the bottom non-skid portion 540 extends outside the perimeter of the bottom surface 530 and forms a skirt on the bottom of the non-skid container 500.

Figure 23:
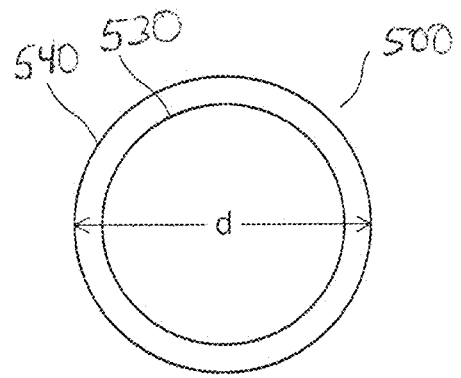
FIG. 23 shows a fourth bottom view of the seventh embodiment of a non-skid container.

FIG. 23 shows a fourth bottom view of the seventh embodiment of the non-skid container 500. In this embodiment, the bottom non-skid portion 540 is an annular ring. That is the outside diameter d of the bottom non-skid portion 540 is equal to the diameter of the bottom surface 530. However, the bottom non-skid portion 540 does not extend to the center of the bottom surface 530 and does not completely cover the bottom surface 530.

Figure 24:
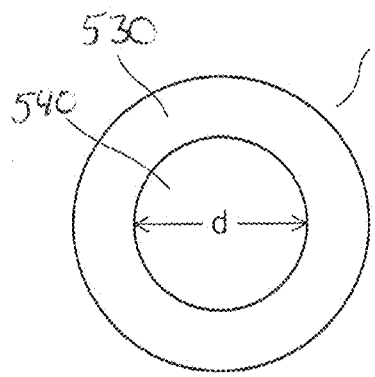
FIG. 24 shows a fifth bottom view of the seventh embodiment of a non-skid container.

FIG. 24 shows a fifth bottom view of the seventh embodiment of the non-skid container 500. In this embodiment, the bottom non-skid portion 540 has a smaller diameter d than the diameter of the bottom surface 530.

It should be noted that features described for the above exemplary embodiments are not exclusive and may be mixed and matched to the different embodiments. For example, the tab 542 of FIG. 21 may be applied to any of the embodiments of FIGS. 22-24, the annular ring of FIG. 23 may be applied as a skirt such as shown in FIG. 22, etc.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A non-skid container, comprising:
 a base portion including a flat portion and a plurality of studs;
 an outer bowl including a sidewall, a plurality of posts, a top opening, a bottom opening and a recess, wherein the posts are configured to be coupled to the studs, thereby coupling the outer bowl to the base portion;
 an inner bowl configured to be coupled to the outer bowl by inserting the inner bowl into the recess of the outer bowl; and
 a ring configured to be coupled to a support surface of the outer bowl, wherein a lip of the inner bowl is coupled to the outer bowl by being placed over the ring.

2. The non-skid container of claim 1, further comprising:
 a splash guard configured to be coupled to the inner bowl, wherein an inner edge of the splash guard extends over a top opening of the inner bowl.

3. The non-skid container of claim 1, wherein the flat portion of the base portion is constructed of a material having a durometer hardness (Shore A) in the range of 5-45.

4. The non-skid container of claim 1, wherein the plurality of studs of the base portion are constructed of a material having a durometer hardness (Shore A) in the range of 45-90.

5. The non-skid container of claim 1, wherein the flat portion of the base portion is constructed of a material having a first durometer hardness (Shore A) and the plurality of studs of the base portion are constructed of a material having a second durometer hardness (Shore A), wherein the second durometer hardness is greater than the first durometer hardness.

6. The non-skid container of claim 1, wherein the base portion is constructed of a silicone material.

7. The non-skid container of claim 1, wherein each of the plurality of studs includes a rib that reinforces the stud.

8. The non-skid container of claim 1, wherein each of the plurality of studs is configured as one of a male connecting member or a female connecting member and each of the posts are configured as an other one of the male connecting member or the female connecting member.

9. The non-skid container of claim 1, wherein the posts are one of releasably or permanently coupled to the studs.

10. The non-skid container of claim 1, wherein the base portion further comprises a handle for lifting the non-skid container.

11. A non-skid container, comprising:
 a base portion including a flat portion and a plurality of studs wherein each of the plurality of studs includes a rib that reinforces the stud;
 an outer bowl including a sidewall, a plurality of posts, a top opening, a bottom opening and a recess, wherein the posts are configured to be coupled to the studs, thereby coupling the outer bowl to the base portion; and
 an inner bowl configured to be coupled to the outer bowl by inserting the inner bowl into the recess of the outer bowl.

* * * * *